(12) United States Patent
Hovestadt

(10) Patent No.: US 7,783,307 B2
(45) Date of Patent: Aug. 24, 2010

(54) SECURITY SYSTEMS FOR PROVIDING MOBILE DEVICE FEATURE ACCESS CONTROL

(75) Inventor: Guido Hovestadt, Wickede-Ruhr (DE)

(73) Assignee: Harman Becker Automotive GmbH, Karlsbad (DE)

( * ) Notice: Subject to any disclaimer, the term of this patent is extended or adjusted under 35 U.S.C. 154(b) by 1091 days.

(21) Appl. No.: 11/389,671

(22) Filed: Mar. 24, 2006

(65) Prior Publication Data

US 2006/0258385 A1 Nov. 16, 2006

(30) Foreign Application Priority Data

Mar. 24, 2005 (EP) .................................. 05006547

(51) Int. Cl.
H04W 48/04 (2009.01)
H04W 4/04 (2009.01)
H04W 12/00 (2009.01)
(52) U.S. Cl. ...................... 455/456.4; 455/411; 455/420
(58) Field of Classification Search ............... 455/456.4
See application file for complete search history.

(56) References Cited

U.S. PATENT DOCUMENTS

2007/0129012 A1* 6/2007 Snow .......................... 455/26.1

FOREIGN PATENT DOCUMENTS

WO WO 2004/089021 A 10/2004

* cited by examiner

Primary Examiner—Philip J Sobutka
(74) Attorney, Agent, or Firm—The Eclipse Group LLP

(57) ABSTRACT

A mobile communication unit having at least one operating mode comprising a security unit for enabling/disabling at least one operating mode, whereas the security unit is designed in such a way that at least one operating mode is temporarily disabled for the user of the mobile communication system. A checkpoint communicating unit may be used to control the operating mode of the mobile communication unit. The checkpoint communicating unit may include a status extracting unit for generating a request for a security status of the operating mode or operating modes of the mobile communication unit. The checkpoint may also include a lookup table containing at least the operating mode or operating modes to be disabled in the mobile communication unit. A comparison unit may be provided for comparing the security status received from the mobile communication unit to the disabling status stored in the lookup table.

30 Claims, 5 Drawing Sheets

FIG. 2

| LOOK UP TABLE | |
|---|---|
| VIDEO MODE | DISABLED |
| PHOTO MODE | DISABLED |
| TELEKOMMUNICATION MODE | ENABLED |
| NOISE GENERATING MODE | ENABLED |
| RECORDING MODE | DISABLED |

163

SECURITY SYSTEMS FOR PROVIDING MOBILE DEVICE FEATURE ACCESS CONTROL

RELATED APPLICATIONS

This application claims priority of European Patent Application Ser. No. 05 006 547.3, filed on Mar. 24, 2005, titled SECURITY SYSTEM; which is incorporated by reference in this application in its entirety.

BACKGROUND OF THE INVENTION

1. Field of the Invention

This invention relates to mobile devices, and more particularly to a security system for controlling access to functions or features in mobile devices.

2. Related Art

Mobile devices having an increasing variety of features (or, operating modes) are becoming available in ever-increasing numbers. For example, cellular phones often have a camera for taking pictures. Personal Digital Assistants (PDAs) also have increasingly more sophisticated functions and features. For example, some PDAs include a voice recorder for recording speech data, or a telecommunications module for transmitting the recorded data to anywhere in the world using telecommunication networks such as cellular telecommunication systems, or even the Internet.

These feature-rich mobile devices have also created some problems. There are areas in which the use of some of the features on cellular phones or PDAs may be highly unwelcome. In particular, mobile devices with photo or video capabilities are not welcome in public restrooms or locker rooms or in other areas providing visual access to information (e.g. classified information in a company) or images that should not leave the area. Such information or images may be recorded and transmitted all over the world using the combination of the photo/video features plus the communication unit/telecommunication features of the mobile device. The availability of such feature-rich mobile devices has led to their confiscation or prohibition when a user enters such areas. For the user of the mobile device, this means the user is not allowed to use or to take the mobile device into the areas. The user typically hands over the mobile device before entering such a restricted area. In this case the user cannot be reached by third persons by the mobile device or the user cannot use the features of the device that are prohibited in the area.

Therefore, a need exists for providing a way of disabling features on mobile devices in a way that prevents the user from enabling that feature without the permission of a supervising agent, thereby precluding the need for the user to deposit the mobile communication unit before entering a predetermined area, and allowing for the user to use the other features of the mobile device that were not disabled by the supervising agent.

SUMMARY

In view of the above, systems consistent with the present invention include a mobile communications unit having at least one operating mode and a security (or enabling/disabling unit) for enabling/disabling the at least one operating mode. The security unit of the mobile communication unit temporarily disables at least one operating mode for the user of the mobile communication unit. This means that the user may not enable the operating mode on his/her own allowing the user to keep the mobile communication unit while entering an area where use of at least one of the operating modes of the mobile communication unit is prohibited.

According to one embodiment of the invention, the security unit is designed in such way, that the operating modes or operating mode cannot be enabled by the user for a predetermined amount of time. In this case, when the predetermined amount of time has run out, the user of the communication unit may be able to reactivate the operating mode that was disabled.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The components in the figures are not necessarily to scale, emphasis instead being placed upon illustrating the principles of the invention. In the figures, like reference numerals designate corresponding parts throughout the different views.

FIG. 2 depicts an example of a lookup table that may be stored in a checkpoint for determining the operating modes to be disabled at the mobile communication unit;

DETAILED DESCRIPTION

Figure 1:
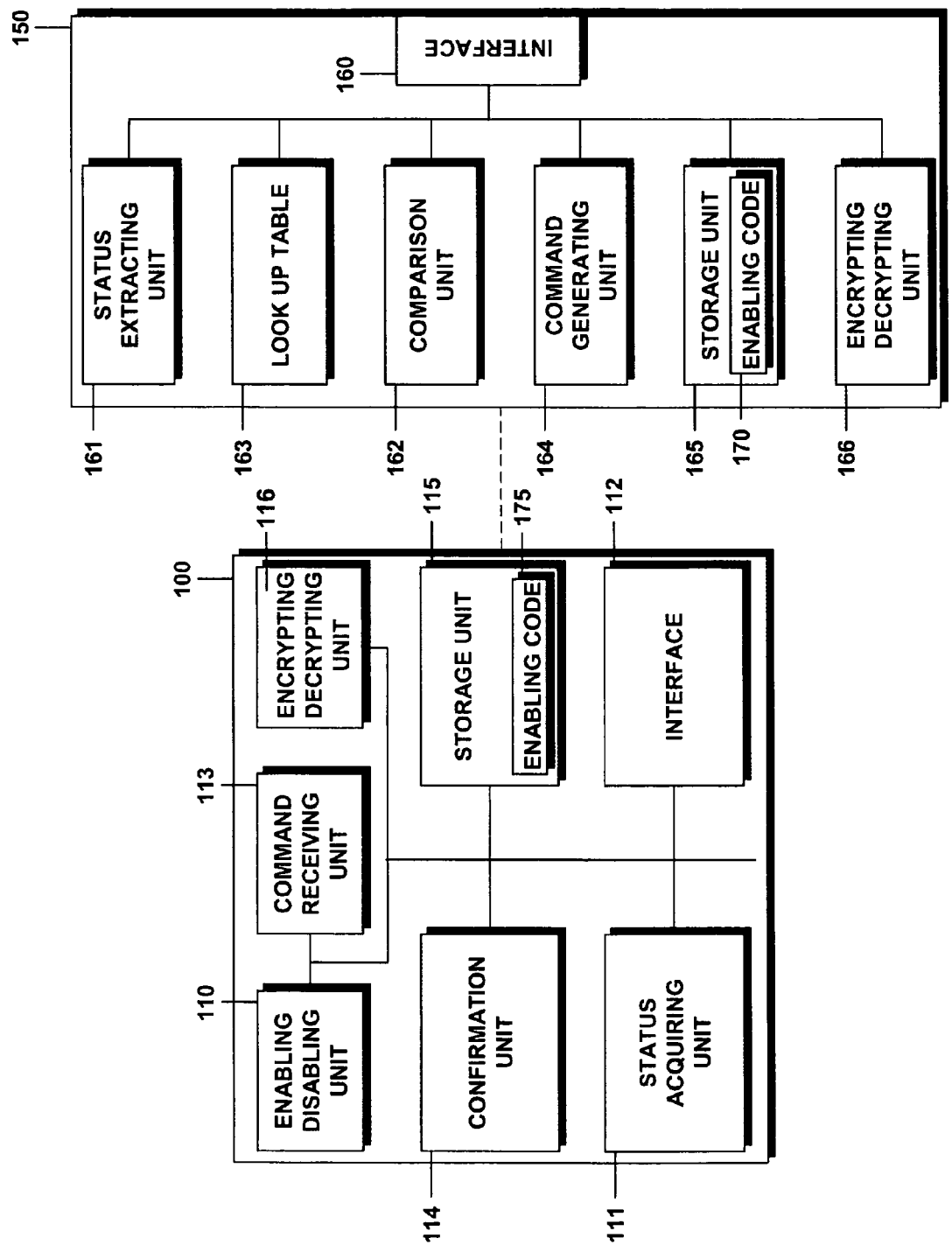
FIG. 1 is a block diagram of a system for controlling the operating mode of a mobile communication unit.

FIG. 1 is a block diagram of a system for controlling the operating mode of a mobile communication unit. In FIG. 1, a user having a mobile communication unit 100 enters an area in which the use of some operating modes of the communication unit 100 may be prohibited. A checkpoint 150 supervises the access to the restricted area, which may be a part of a company, where part of the premises could provide one with access to confidential information. As described herein, the checkpoint 150 may refer to a location where a user checks in and it may include an external communication unit operable to communicate with the mobile communication unit 100. The checkpoint 150 may also be used by a user that may be responsible for monitoring access to the restricted area. Traditionally, in the checkpoint 150 area, the user of a mobile phone having a photo or video operating mode may not be admitted with the mobile phone. The user may even have to leave the mobile communication unit 100 at the entrance before entering the area.

The mobile communication unit 100 may have several operating modes, such as for example, a telecommunication operating mode, a photo operating mode, a video operating mode, any speech or data recording mode, a media data reproducing mode (i.e. music files), a noise generating mode (i.e. for an audible ring tone that may be set to a silent mode), among other operating modes. When the user wants to take the mobile communication unit 100 into a restricted area, the operating modes not permitted in the restricted area may be disabled using a security unit 110, which allows the enabling or disabling of different operating modes. Normally, the status of the different operating modes may not be known to a third person controlling the mobile communication unit 100 or to the checkpoint 150. A status acquiring unit 111 may collect the enabling or disabling status of the different features or operating modes of the mobile communication unit 100. The security unit 110 can enable or disable each of the different operating modes or a group of operating modes.

During operation, the checkpoint 150 may exchange security (or enabling/disabling) status information with the mobile communication unit 100. The mobile communication unit 100 exchanges data over a mobile communication interface 112 with the checkpoint 150. The checkpoint 150 includes a suitable checkpoint interface 160 compatible with the mobile communication interface 112. The mobile communication interface 112 may use any of a variety of communication technologies, be it wireless communication technologies or wired communication technologies. For example, information may be communicated wirelessly using Bluetooth technology or infrared technology. One of ordinary skill in the art will understand that the mobile communication unit 100 and the checkpoint 150 may communicate using any technology.

When the status acquiring unit 111 has acquired information indicative of a disabling status of the mobile communication unit 100, the disabling status is sent to the checkpoint 150 via mobile communication interface 112 and received at the checkpoint interface 160. When the checkpoint 150 receives the security status, a status extracting unit 161 extracts the disabling status of the different operating modes of the mobile communication unit 100. A comparison unit 162 compares the security status of the mobile communication unit 100 to a disabling status stored in a lookup table 163. As explained below, with reference to FIG. 2, the lookup table 163 stores at least the operation mode that should be disabled when entering the restricted area. The comparison unit 162 checks whether the operating modes that are to be disabled according to the lookup table 163 are also disabled in the mobile communication unit 100. If one of the operating modes that is to be disabled before entering the restricted area remains enabled in the mobile communication unit 100, the checkpoint 150 informs the mobile communication unit 100 of the operating modes to be disabled. A command generating unit 164 is provided for generating a command for the mobile communication unit 100. The command includes the information indicating the operating mode or modes to be disabled in the mobile communication unit 100. The command is then communicated to the mobile communication unit 100 and processed by a command receiving unit 113 of the mobile communication unit 100. The command receiving unit 113 extracts the information indicating the operating mode or modes to be disabled and transfers information to the security unit 110.

The user of the mobile communication unit 100 may be informed of the changes of the operating modes initiated by the checkpoint 150. For example, information indicative of a status change may be displayed on a display (not shown) and the user may be asked to confirm the changing operating mode using a confirmation unit 114.

The security unit 110 performs the function of enabling and disabling operating modes based on information provided by the checkpoint 150. The security unit 110 operates in different ways. In one example, the security unit 110 disables predetermined operating modes for a predetermined amount of time. In another example, the security unit 110 disables specific operating modes or disables predetermined functional blocks of the operating modes, e.g., all multimedia operating modes. The disabling of the operating mode can be effected by confirming a message received from the checkpoint 150. In another example, the user of the mobile communication unit 100 may input a disabling code in the security unit 110 for disabling a predetermined operating mode. Additionally, a position determination unit (not shown) may be provided for determining the geographical position of the mobile communication unit 100. The geographical position can be transmitted to the checkpoint 150. The checkpoint 150 determines whether the mobile communication unit 100 has already left the restricted area.

In these examples, the user of the mobile communication unit 100 is prevented from enabling the disabled operating mode. If an operating mode has been disabled upon approval by the user, the user is not permitted to enable the disabled operating mode. If the operating mode was disabled for a predetermined amount of time, the operating mode may be re-enabled automatically after the time has lapsed, or by using an exchange protocol between the mobile communication unit 100 and the checkpoint 150. Disabled operating modes may be re-enabled in other ways, which may require that the communication unit 100 communicate with the checkpoint 150.

One example of a way of re-enabling a disabled operating code may be initiated by the mobile communication unit 100, either automatically, or through user input. The checkpoint 150 includes a first storage unit 165, where a first part of an enabling code 170 is stored. The mobile communication unit 100 includes a second storage unit 115 where a second part of an enabling code 175 is stored. The first part of the enabling code 170 is combined with the second part of the enabling code 175 and stored in a storage unit 115 of the mobile communication unit 100 when the operating mode is enabled. When the confirmation unit 114 confirms that an operating mode is to be disabled, the first part of the enabling code 170, which was sent from the checkpoint 150, can be stored in the second storage unit 115. The disabled operating mode may be re-enabled when the first portion of the enabling code 170 and the second portion of the enabling code 175 provided in the checkpoint 150 are again combined. When the user leaves the restricted area, the user may initiate a re-enabling operation to re-enable the disabled operating mode or modes. During this operation, the second part of the enabling code 175 may be transferred to the mobile communication unit 100, where it may be combined again. Alternatively, re-enabling information from the checkpoint 150 (e.g. the first part of the enabling code 170) may also be transmitted to the mobile communication unit 100 via a telecommunication network. Use of a telecommunications network may help if the user of the mobile communication unit 100 has forgotten to re-enable the operating mode after leaving the restricted area. The user can then contact the supervising authority of the checkpoint 150, and the checkpoint 150 will transmit the needed part of the enabling code 170. In other examples, the data exchange can be done using known wired or wireless exchange techniques such as Bluetooth, etc.

In general, a third party should not be permitted to disable or enable an operating mode of the mobile communication unit 100 without the approval of its user. The checkpoint 150 authenticates itself to the mobile communication unit 100. The user of the mobile communication unit 100 then confirms that the checkpoint 150 or supervision authority and the mobile communication unit 100 start a disabling dialogue. In order to ensure that the data exchange between the two units and the transmitted information cannot be accessed by third parties, the data may be processed using data encryption techniques. Data encryption is performed by an encrypting/decrypting unit 116 provided in the mobile communication unit 100 and another encrypting/decrypting unit 166 provided in the checkpoint 150. The two encrypting/decrypting units 160,166 ensure that once the communication line between the two units has been established, a third party cannot access the mobile communication unit and change the status of the security modes.

When the mobile communication unit 100 (via the security unit) has disabled the operating mode, the supervising authority using the checkpoint communication unit 150 may require confirmation that the command to disable the predetermined operating mode was followed. In the example shown in FIG. 1, the mobile communication unit 100 includes the disabling confirmation unit 114, which performs a function of confirming the disabling status of the operation mode to be disabled. This confirmation may then be communicated to the external communication unit (also called the checkpoint communication unit 150).

In examples of the invention, such as the example shown in FIG. 1, the mobile communication unit 100 may be a cellular phone, a PDA or any other electronic device. Furthermore, the mobile communication unit 100 may also be an electronic player for playing audio or video files and/or for recording them. Additionally, the mobile communication unit 100 may include vehicles in which photo or video cameras are incorporated for recording the driving route. It is possible that a supervising authority does not wish the vehicle to enter a predetermined area when the photo or video cameras are enabled. As a consequence, the mobile communication unit 100 may be the vehicle or part of the vehicle in which the predetermined operating mode is disabled by the checkpoint 150 or supervising authority.

The mobile communication unit 100 may also include a protection unit which prevents the manipulation of the lookup table 163 or of the enabling code stored in the storage unit 115 of the mobile communication unit 100. The protection unit can further prevent the manipulation of the disabled operating modes. The protection unit may be mechanical or electrical protection schemes that can assure that disabled operating modes stay disabled and that enabled operating modes to be disabled will be actually disabled. By way of example, the protection unit may provide a key for enabling/disabling the software modules that are necessary for the functioning of the different operating modes.

The protection unit may also include a key that may be provided by the protection unit for enabling or disabling software modules. The protection unit may, depending on the disabling or enabling status of the different operating modes, lock or unlock the keys that are necessary for the different operating modes. A "patching" of the software module can be prevented by using the keys. These keys do not depend on the security code of the mobile communication unit 100 that is used for enabling the operating modes by the checkpoint. This protection unit may be designed as an integrated chip, that would make manipulation by the user difficult.

According to another example of an embodiment, the mobile communication unit 100 may include a digital signature to allow the mobile communication unit 100 to be certified as a mobile communication unit 100 with the checkpoint 150 as a "trusted" device. The information provided in the checkpoint 150 that predetermined mobile communication units 150 are classified as being trustworthy, i.e., whether a mobile communication unit is trustworthy or not, can be provided in a database, to which the checkpoint 150 may have access via a network, for example. Optionally the checkpoint 150 may recognize a mobile communication unit 100 when it re-enters the restricted area. Furthermore, the checkpoint 150 may itself classify the mobile communication unit 100 as being trustworthy, once the security status of the operating modes has been checked.

FIG. 2 is a schematic view of one example of a lookup table 163. In the lookup table, the supervising authority can determine which of the operating modes have to be disabled when a user wants to enter the restricted area. In the example shown in FIG. 2, the lookup table 163 is configured such that all the multimedia operation modes and a voice recording mode are disabled when the user enters the restricted area with the mobile communication unit 100. In the example shown in FIG. 2, the user can use the cellular phone to have a telephone conversation, but not for taking pictures. In this example, the specific operating modes that are to be disabled will depend on the nature of the area. For example, in an airplane or a theatre, the operating company may not permit operation of the telecommunication mode or of an audible tone. In this case, the telecommunication mode and the noise generating mode would be disabled. The entries of the lookup table 163 determine which operating modes are to be disabled when the user enters the restricted area.

Figure 3:
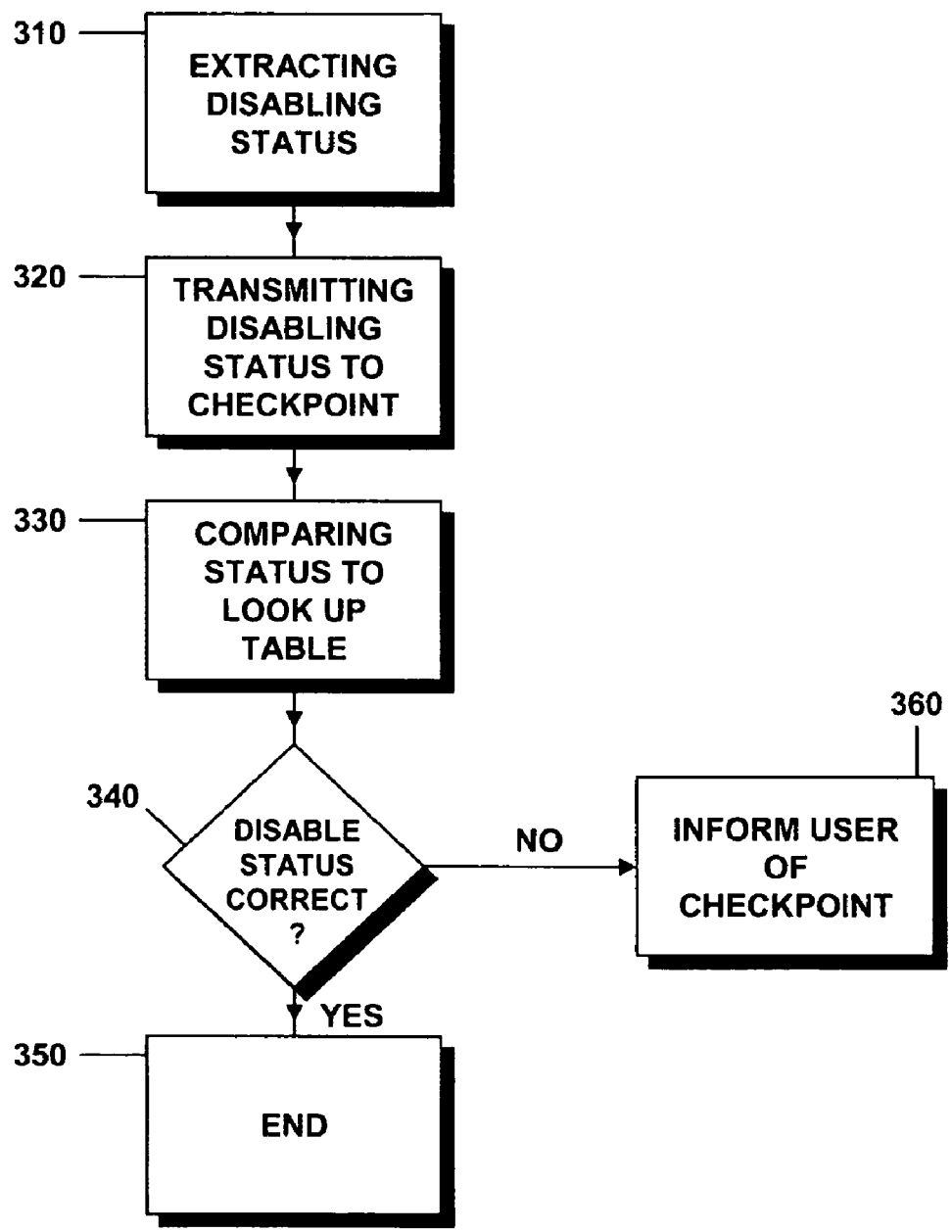
FIG. 3 shows a flow chart for controlling the disabling status in one example embodiment.

FIG. 3 is a flowchart depicting an example of a method for controlling the operating modes of a mobile communication unit 100. In the example illustrated by the flowchart in FIG. 3, it is assumed that a user of the mobile communication unit 100 is entering a restricted area monitored by a user of the checkpoint communication unit 150. At step 310, information relating to the disabling or enabling (i.e. disabling/enabling status) of the operating modes is retrieved in the mobile communication unit 100. The security status is then transmitted to the checkpoint communication unit 150 at step 320. In the checkpoint 150, the security status is then compared to the entries of the lookup table 163 (step 330). In step 340, the disabling status of the mobile communication unit 100 contained in the security status is tested against the disabling status stored in the lookup table (step 340). If the operating modes to be disabled are already disabled in the mobile communication unit 100, the user may enter the restricted area and the method ends in step 350. Optionally, the user of the checkpoint 150 may also be informed that the disabling status of the mobile communication unit 100 is correct. If the disabling status of the mobile communication unit 100 does not correspond to the predetermined disabling status in the lookup table 163, the user of the checkpoint 150 will be informed (step 360). The user of the checkpoint 150 may then request that the user of the mobile communication unit 100 disable the operating mode or request that the user of the mobile communication unit 100 leave the communication unit 100 at the checkpoint before entering the restricted area.

Figure 4:
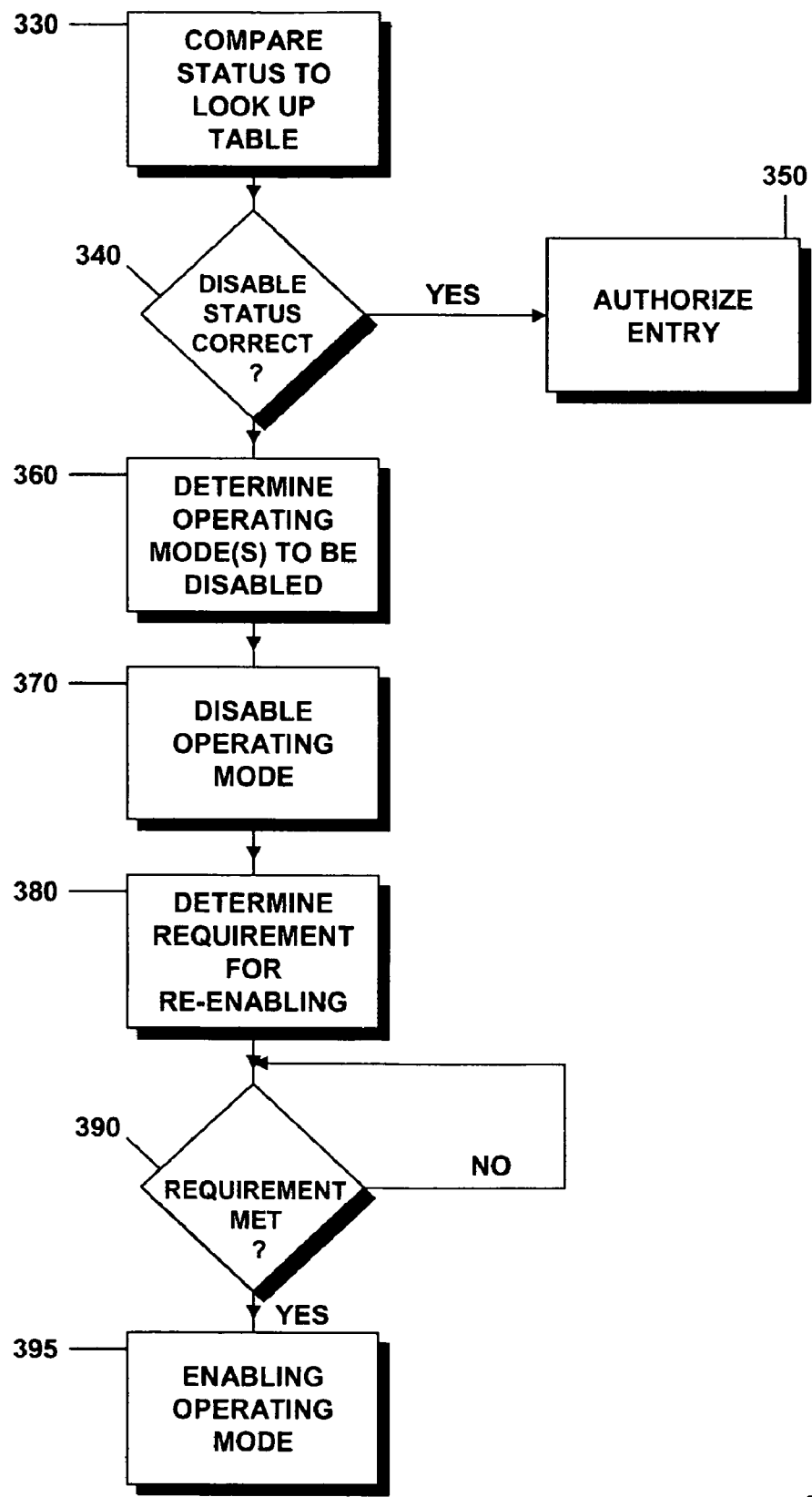
FIG. 4 shows a flow chart with another embodiment for disabling an operating mode.

FIG. 4 is another flowchart illustrating an example of a method in which the checkpoint 150 actively controls the security status of the mobile communication unit 100. As discussed above with reference to FIG. 3, the status of the mobile communication unit 100 is compared to the status lookup table in step 330. In step 340, the disabling status of the mobile communication unit 100 is checked to determine if it is correct (step 340). If it is correct, entry into the restricted area is authorized in step 350.

If the disabling status does not coincide with the disabling status of the lookup table 163, the checkpoint 150 determines which of the operating modes are to be disabled at the mobile communication unit 100 (step 360). In step 370, the operating mode or modes are disabled (step 370). As discussed below with reference to FIG. 5, the user may be asked to confirm that the operating mode of the mobile communication unit 100 is to be disabled. Furthermore, when the operating mode is disabled, the checkpoint 150 and/or the mobile communication unit 100 may determine how the operating mode may be re-enabled (step 380). The checkpoint 150 and the user of the mobile communication unit 100 may then agree on how the operating mode that was disabled may be re-enabled. The re-enabling may take place either automatically after a timeout or the mobile communication unit 100 and the checkpoint 150 may exchange enabling information. This enabling information may depend on the geographical position of the communication unit. When the user has left the restricted area, the position of the user may be communicated to the checkpoint 150. The checkpoint 150 checks the position and sends an enabling command if the user is in a position where the operating mode may be re-enabled. The re-enabling may also be performed when the user passes a checkpoint location 150 upon leaving the restricted area. In this case, an enabling command may be sent by the checkpoint 150 to the mobile communication unit 100.

In step 390, the enabling requirement determined in step 380 is checked to see if it was met (step 390). If the requirement was not met, the system waits until the requirement is met in accordance with the above-mentioned examples. That is, the system waits until the user has left the predetermined area, the time limit has expired or the user has passed the checkpoint location at the exit of the restricted area where a data exchange of the enabling code re-enabled the disabled operating mode. If the requirement is met, the operating mode is re-enabled (step 395). The example shown in FIG. 4, illustrates how the checkpoint 150 may actively control the operating modes of the mobile communication unit 100.

Figure 5:
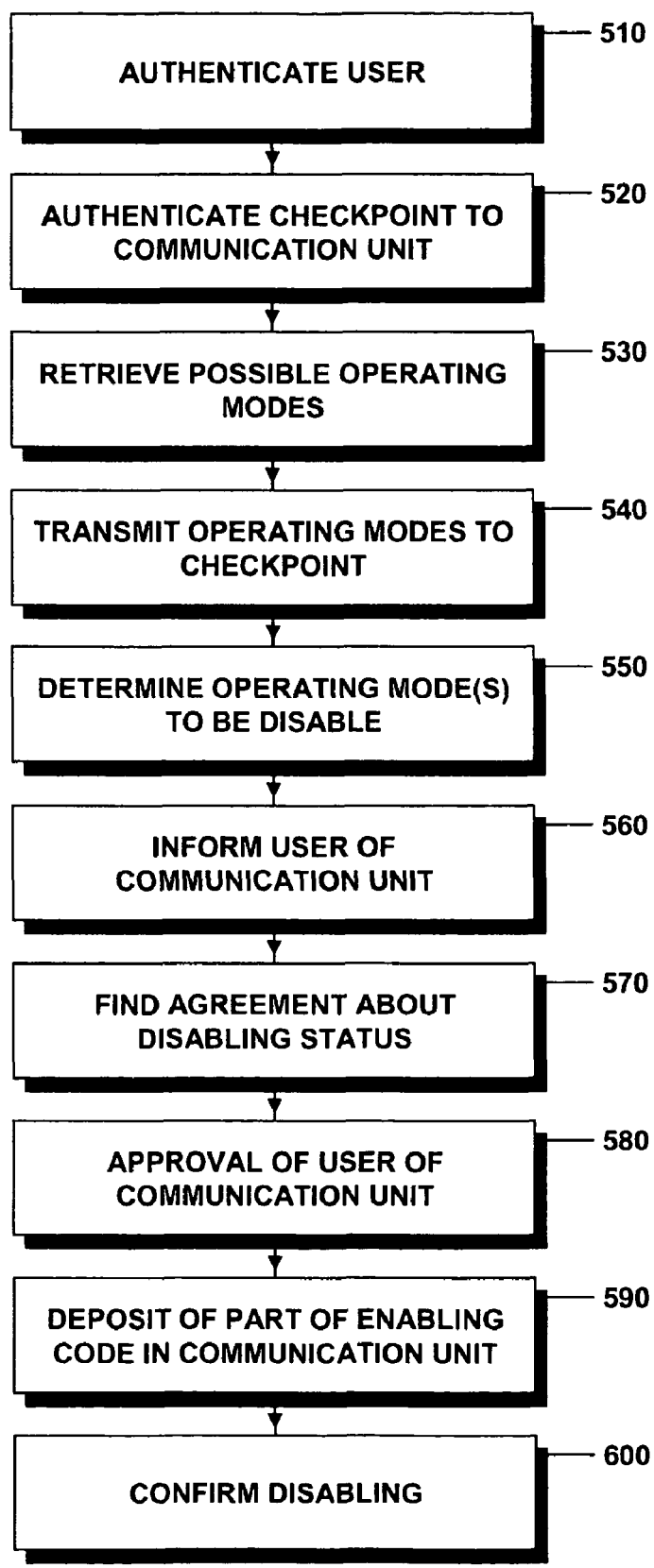
FIG. 5 shows a flow chart for the communication between the communication unit and the checkpoint.

FIG. 5 depicts an example of a communication protocol that may be followed between the checkpoint 150 and the mobile communication unit 100. The steps shown in FIG. 5 may be used for purposes of disabling and/or re-enabling an operating mode or several operating modes of the mobile communication unit 100. In step 510, the user is first authenticated for the mobile communication unit 100 to ensure that the right user starts the disabling procedure of the mobile communication unit 100. In step 520, the checkpoint 150 is authenticated to allow the communication unit 100 to identify the supervising authority in order to know which system is transmitting the disabling command. Optionally, the user may also be authenticated to the checkpoint 150.

In step 530, the operating modes at issue are retrieved in the mobile communication unit 100. In step 530, the operating modes of the mobile communication unit 100 and the respective security status are also retrieved. In step 540, the retrieved information is transmitted to the checkpoint 150 and in step 550, the operating modes that are to be disabled before entering the restricted area are determined. The operating modes to be disabled are determined by comparing the disabling status of the mobile communication unit 100 to the disabling status stored in the lookup table 163. After determining the operating modes to be disabled, the user of the mobile communication unit 100 is informed of the upcoming changes in the status of the operating modes (step 560). In step 570, the user of the communication unit 100 and the checkpoint 150 agree on the disabling status and on how the operating mode is to be disabled. Before the operating mode is disabled, the user of the mobile communication unit 100 may approve the change in the disabling status (step 580). This gives the user control over the enabling and disabling of features on his device. When the user has approved the disabling of one or several of the operating modes, the checkpoint communication unit 150 transmits part of the enabling code to the mobile communication unit 100, where it is stored in the storage unit 115. The other part of the enabling code is located in another location, for example, at the checkpoint 150. After the deposit of the enabling code in step 590, the disabling status of the operating mode of the mobile communication unit 100 is confirmed at the checkpoint 150 (step 600).

Examples of the present invention that provide an end user with the ability to take a mobile communication unit (such as a cellular phone or a PDA) having different operating modes (or features, such as a camera, video, etc.) to a restricted area, where the use of some of the operating modes may not be allowed. Many scenarios for advantageous use of examples of the present invention are possible. Such as, for example, the operating modes may be controlled when the user wants to enter a research department or when the user wants to enter a public swimming bath, where the visitors should not be able to take photos. Other examples of restricted areas include a theatre, cinema, or any other events, where some of the operating modes of the communication unit could be disturbing.

One skilled in the art will appreciate that all or part of systems and methods consistent with the present invention may be stored on or read from the storage units 115, 165 depicted in FIG. 1, or other machine-readable media. For example, secondary storage devices such as hard disks, floppy disks, and CD-ROMs; a signal received from a network; or other forms of ROM or RAM either currently known or later developed. Further, although specific components of the mobile communication unit 100 and the checkpoint communication unit 150 are described, one skilled in the art will appreciate that a system suitable for use with methods, systems, and articles of manufacture consistent with the present invention may contain additional or different components. For example, a central processor unit ("CPU") may be used to perform methods and software designed to perform functions consistent with the present invention. Such a CPU may include a microprocessor, microcontroller, application specific integrated circuit ("ASIC"), discrete or a combination of other types of circuits acting as a central processing unit. The memory used for storage units 115, 165 may be RAM, DRAM, SDRAM, or any other type of read/writeable memory.

Further, persons skilled in the art will understand and appreciate, that one or more processes, sub-processes, or process steps described in connection with FIGS. 1 through 5 may be performed by hardware and/or software. Additionally, the security system may be implemented completely in software that would be executed within a processor or plurality of processor in a networked environment. Examples of a processor include but are not limited to microprocessor, general purpose processor, combination of processors, DSP, any logic or decision processing unit regardless of method of operation, instructions execution/system/apparatus/device and/or ASIC. If the process is performed by software, the software may reside in software memory (not shown) in the device used to execute the software. The software in software memory may include an ordered listing of executable instructions for implementing logical functions (i.e., "logic" that may be implemented either in digital form such as digital circuitry or source code or optical circuitry or chemical or biochemical in analog form such as analog circuitry or an analog source such an analog electrical, sound or video signal), and may selectively be embodied in any signal-bearing (such as a machine-readable and/or computer-readable) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "machine-readable medium," "computer-readable medium," and/or "signal-bearing medium" (herein known as a "signal-bearing medium") is any means that may contain, store, communicate, propagate, or transport the program for use by or in connection with the instruction execution system, apparatus, or device. The signal-bearing medium may selectively be, for example but not limited to, an electronic, magnetic, optical, electromagnetic, infrared, or semiconductor system, apparatus, device, air, water, or propagation medium. More specific examples, but nonetheless a non-exhaustive list, of computer-readable media would include the following: an electrical connection (electronic) having one or more wires; a portable computer diskette (magnetic); a RAM (electronic); a read-only memory "ROM" (electronic); an erasable programmable read-only memory (EPROM or Flash memory) (electronic); an optical fiber (optical); and a portable compact disc read-only memory "CDROM" "DVD" (optical). Note that the computer-readable medium may even be paper or another suitable medium upon which the program is printed, as the program can be electronically captured, via, for instance, optical scanning of the paper or other medium, then compiled, interpreted or otherwise processed in a suitable manner if necessary, and then stored in a computer memory. Additionally, it is appreciated by those skilled in the art that a signal-bearing medium may include carrier wave signals on propagated signals in telecommunication and/or network distributed systems. These propagated signals may be computer (i.e., machine) data signals embodied in the carrier wave signal. The computer/machine data signals may include data or software that is transported or interacts with the carrier wave signal.

The foregoing description of an implementation has been presented for purposes of illustration and description. It is not exhaustive and does not limit the claimed inventions to the precise form disclosed. Modifications and variations are possible in light of the above description or may be acquired from practicing the invention. For example, the described implementation includes software but the invention may be implemented as a combination of hardware and software or in hardware alone. Note also that the implementation may vary between systems. The claims and their equivalents define the scope of the invention.

What is claimed is:

1. A mobile communication unit having at least one operating mode, the mobile communication unit comprising:
   a security unit for enabling or disabling the at least one operating mode, where the security unit temporarily disables the at least one operating mode for the user of the mobile communication system;
   a communication interface for receiving an enabling code from a checkpoint, a first part of the enabling code being communicated to the mobile communication unit in one communication and a second part of the enabling code being communicated in another communication; and
   a mobile device storage unit for storing the second part of an enabling code when the at least one operating mode is disabled;
   the security unit being configured to combine the first part and the second part of the enabling code to permit re-enabling of the at least one operating mode when the mobile communication unit receives the first part of the enabling code.

2. The mobile communication unit of claim 1 further comprising:
   a command receiving unit for receiving a security command from an external communication unit, where when the mobile communication unit receives a disabling command from the external communication unit, the security unit disables the operating mode in such a way that the operating mode cannot be enabled by the user of the mobile communication unit.

3. The mobile communication unit of claim 1 further comprising:
   a disabling confirmation unit which confirms a disabling status of at least one operating mode of the communication unit, the security unit being configured to store the second part of the enabling code when the disabling confirmation unit has confirmed the disabling status.

4. The mobile communication unit of claim 1 further comprising:
   an operating mode status acquiring unit for acquiring the security status of said at least one operating mode.

5. The mobile communication unit of claim 1 where the operating mode of the communication unit comprises at least one of the following operating modes: a photo operating mode, a video operating mode, a data recording operating mode, a media data reproducing mode, a noise generating mode.

6. The mobile communication of claim 1 further comprising:
   an encrypting/decrypting unit for encrypting/decrypting data received from the outside or data sent to the outside.

7. A checkpoint communication unit for controlling the operating mode of a mobile communication unit, the checkpoint communication unit comprising:
   a status extracting unit for generating a request for a security status of at least one operating mode of the mobile communication unit;
   a look up table containing at least one operating mode to be disabled and a disabling status for the at least one operating mode to be disabled;
   a checkpoint storage unit for storing a first part of an enabling code when the at least one operating mode is disabled, the checkpoint communication unit being configured to send the second part of the enabling code to the mobile communication unit when the at least one operating mode is disabled and to send the first part of the enabling code when the at least one operating mode is re-enabled;
   a comparison unit for comparing the security status received from the mobile communication unit to the disabling status stored in the look up table; and
   a command generating unit for generating a disabling command for the mobile communication unit when the security status of the communication unit comprises the information that one operating mode to be disabled is enabled at the mobile communication unit.

8. The checkpoint communication unit of claim 7 further comprising an interface for exchanging data with a mobile communication unit.

9. The checkpoint communication unit of claim 7 further comprising an encrypting/decrypting unit for encrypting/decrypting data received from the outside or sent to the outside.

10. A method for controlling an operating mode of a mobile communication unit, the mobile communication unit comprising at least one operating mode, the method:
    detecting the mobile communication unit in a restricted area;
    receiving a disabling/enabling status of the operating mode from the mobile communication unit;
    generating a disabling command indicating the operating mode to be disabled and an enabling code having a first part and a second part if the disabling/enabling status of the operating mode indicates that the operating mode is to be disabled in the restricted area;

storing the first part of the enabling code in a storage unit;

sending the disabling command and the second part of the enabling code to the mobile communication unit; and sending the first part of the enabling code to the mobile communication unit when the mobile communication unit has exited the restricted area.

11. The method of claim 10 further comprising:

determining whether the mobile communication unit is located within a predetermined geographical area;

determining if the mobile communication unit has left said predetermined geographical area; and permitting a re-enabling of the operating modes of the mobile communication unit, which have been previously disabled by sending the first part of the enabling code to the mobile communication unit.

12. The method of claim 10 further comprising:

authenticating the user of the mobile communication unit.

13. The method of claim 10 further comprising:

authenticating the checkpoint unit to the mobile communication unit.

14. The method of claim 10 further comprising:

determining the operating modes of the mobile communication unit and the respective security status.

15. The method of claim 10 further comprising:

coming to a mutual agreement with the mobile communication unit about the way of disabling the operating modes.

16. The method of claim 10 where the mobile communication unit and the checkpoint use encryption techniques during data exchange.

17. The method of claim 10 where the second part of the enabling command is communicated to the mobile communication unit via a telecommunication network.

18. The method of claim 10 further comprising:

before the step of sending the first part of the enabling code, detecting when the mobile communication unit has exited the restricted area.

19. The method of claim 10 further comprising:

before the step of sending the first part of the enabling code, receiving a request to re-enable the operating mode of the mobile communication unit.

20. The method of claim 10 further comprising:

comparing a security status of the operating mode of the mobile communication unit to a look up table containing a predetermined disabling status of a plurality of different operating modes.

21. The method of claim 20 further comprising:

determining if the disabling/enabling status received from the mobile communication unit is not in correspondence to a disabling status stored in a look-up table; and changing the operating mode of the mobile communication unit which is not in accordance with the predetermined disabling status of the look up table.

22. The method of claim 21 further comprising:

retrieving a list of disabled operating modes;

checking whether the disabled operating modes contained in the look up table are also marked as disabled in the list transmitted from the mobile communication unit; and determining the operating mode of the mobile communication unit which is not in accordance with the predetermined disabling status of the look-up table.

23. A method for controlling an operating mode of a mobile communication unit, the mobile communication unit having at least one operating mode, the method comprising:

detecting a checkpoint at a restricted area;

sending a disabling/enabling status of the at least one operating mode to the checkpoint;

receiving a disabling command for selected ones of the at least one operating mode and a first part of at least one enabling code having a first part and a second part, the second part being stored in the checkpoint;

disabling the selected ones of the at least one operating mode;

storing the first part of the enabling code in a storage unit in the mobile communication unit;

receiving the second part of the enabling code; and combining the first part and the second part of the enabling code to re-enable the selected ones of the at least one operating mode.

24. The method of claim 23 further comprising:

before the step of storing the first part of the enabling code, sending a confirmation, of the disabling of the selected ones of the at least one operating mode.

25. The method of claim 23 further comprising:

sending a list of disabled operating modes to the checkpoint to permit a determination of a correspondence with a disabling status in a look-up table in the checkpoint.

26. The method of claim 23 further comprising:

inputting a user input to re-enable a disabled operating mode;

re-enabling the disabled operating mode by performing the step of combining the first and second parts of the enabling code if the mobile communication unit has received the second part of the enabling code.

27. The method of claim 23 further comprising:

requesting the list of operating modes to be disabled.

28. The method of claim 23 further comprising:

coming to a mutual agreement with the checkpoint about the way of disabling the operating modes.

29. The method of claim 23 where the mobile communication unit and the checkpoint use encryption techniques during data exchange.

30. The method of claim 23 where the mobile communication unit receives the second part of the enabling command via a telecommunication network.

* * * * *

UNITED STATES PATENT AND TRADEMARK OFFICE
CERTIFICATE OF CORRECTION

PATENT NO. : 7,783,307 B2 Page 1 of 1
APPLICATION NO. : 11/389671
DATED : August 24, 2010
INVENTOR(S) : Guido Hovestadt It is certified that error appears in the above-identified patent and that said Letters Patent is hereby corrected as shown below:

Title Pg, Item (73) Assignee should be listed as --Harman Becker Automotive Systems GmbH--
At column 1, line 62, change "operating mode and a security" to --operating mode and a security unit--
At column 5, line 3, change "160,166" to --116,166--
At column 5, line 62, change "units 150" to --units 100--
In Claim 10, column 10, line 58, change "the method:" to --the method comprising:--
In Claim 24, column 12, line 29, change "sending a confirmation, of" to --sending a confirmation of--

Signed and Sealed this

Seventh Day of December, 2010

David J. Kappos
*Director of the United States Patent and Trademark Office*